United States Patent
Al-Dawood et al.

(10) Patent No.: US 9,937,458 B2
(45) Date of Patent: Apr. 10, 2018

(54) METHOD FOR DECARBONIZATION OF A FUEL ON BOARD A VEHICLE

(75) Inventors: Ali M. Al-Dawood, Safwa (SA); Fahad Ibrahim Al-Muhaish, Riyadh (SA)

(73) Assignee: Sandi Arabian Oil Company, Dhahran (SA)

( * ) Notice: Subject to any disclaimer, the term of this patent is extended or adjusted under 35 U.S.C. 154(b) by 2754 days.

(21) Appl. No.: 12/452,997

(22) PCT Filed: Feb. 28, 2006

(86) PCT No.: PCT/US2006/007446
§ 371 (c)(1),
(2), (4) Date: Jan. 28, 2010

(87) PCT Pub. No.: WO2006/094137
PCT Pub. Date: Sep. 8, 2006

(65) Prior Publication Data
US 2010/0175639 A1    Jul. 15, 2010

Related U.S. Application Data

(60) Provisional application No. 60/657,775, filed on Mar. 1, 2005.

(51) Int. Cl.
*F02B 43/08* (2006.01)
*B01D 53/00* (2006.01)
(Continued)

(52) U.S. Cl.
CPC .............. *B01D 53/005* (2013.01); *C01B 3/24* (2013.01); *C01B 3/26* (2013.01); *C01B 3/36* (2013.01);
(Continued)

(58) Field of Classification Search
CPC ..... C01B 3/22; C01B 3/24; C01B 2203/1241; C01B 31/02; C01B 2203/0277;
(Continued)

(56) References Cited

U.S. PATENT DOCUMENTS 3,880,982 A    4/1975 Stenzel
3,897,757 A *  8/1975 Abello .......................... 123/1 A
(Continued)

FOREIGN PATENT DOCUMENTS

JP    07-217424    8/1995
JP    08-091803    4/1996
(Continued)

OTHER PUBLICATIONS

Muradov, Nazim, "Hydrogen via methane decomposition: an application for decarbonization of fossil fuels," International Journal of Hydrogen Energy 26, 2001, pp. 1165-1175.
(Continued)

*Primary Examiner* — Long T Tran
(74) *Attorney, Agent, or Firm* — Abelman, Frayne & Schwab

(57) ABSTRACT

A method and apparatus for the reduction of carbon dioxide emissions by the on-hoard treatment of a portion or all of the hydrocarbon fuel used to power an internal combustion engine mounted in a conventional transportation vehicle, utilize known decarbonization technology to break the fuel's hydrogen-carbon bond. The compounds are then cooled and separated into (1) elemental carbon powder that is stored on-board for later recovery and industrial use, and (2) hydrogen, or a hydrogen-rich gas stream, that is burned as a fuel in the ICE and/or diverted to other on-board energy related applications.

18 Claims, 1 Drawing Sheet

(51) Int. Cl.
*C01B 3/24* (2006.01)
*C01B 3/26* (2006.01)
*C01B 3/36* (2006.01)

(52) U.S. Cl.
CPC .............. *C01B 2203/025* (2013.01); *C01B 2203/0272* (2013.01); *C01B 2203/0277* (2013.01); *C01B 2203/0405* (2013.01); *C01B 2203/049* (2013.01); *C01B 2203/06* (2013.01); *C01B 2203/066* (2013.01); *C01B 2203/085* (2013.01); *C01B 2203/0811* (2013.01); *C01B 2203/0822* (2013.01); *C01B 2203/0833* (2013.01); *C01B 2203/0861* (2013.01); *C01B 2203/0883* (2013.01); *C01B 2203/1217* (2013.01); *C01B 2203/1241* (2013.01); *C01B 2203/1247* (2013.01); *C01B 2203/1276* (2013.01); *C01B 2203/1288* (2013.01); *C01B 2203/169* (2013.01); *Y02P 20/128* (2015.11); *Y02T 10/36* (2013.01)

(58) Field of Classification Search
CPC ........ C01B 2203/0822; C01B 2203/84; C01B 2203/0272; C01B 2203/0266; C01B 2203/0405; C01B 2203/1235; C01B 2203/0805; F02M 25/12; B01D 2256/24; B01D 2257/702
USPC ..................... 123/3, 1 A, DIG. 12, 198 A
See application file for complete search history.

(56) References Cited

U.S. PATENT DOCUMENTS

| | | | |
|---|---|---|---|
| 4,182,278 A * | 1/1980 | Coakwell | 123/1 A |
| 6,395,197 B1 | 5/2002 | Detering et al. | |
| 6,846,584 B2 * | 1/2005 | Dutil | H01M 8/0662 429/412 |
| 6,860,923 B2 * | 3/2005 | Myasnikov | B01D 53/02 123/3 |
| 7,047,909 B1 * | 5/2006 | Botti | 123/1 A |
| 2002/0151604 A1 * | 10/2002 | Detering | B01J 19/088 518/703 |
| 2003/0121484 A1 | 7/2003 | Dodd et al. | |
| 2004/0035395 A1 * | 2/2004 | Heywood | F02B 1/12 123/435 |
| 2004/0088970 A1 * | 5/2004 | Mulligan | F01N 3/2073 60/286 |
| 2004/0148860 A1 * | 8/2004 | Fletcher | B01J 19/088 48/127.9 |
| 2004/0200209 A1 * | 10/2004 | Kirwan | B01D 53/02 60/284 |
| 2004/0250790 A1 | 12/2004 | Heywood et al. | |
| 2005/0022450 A1 * | 2/2005 | Tan | B01D 53/9431 48/198.3 |
| 2005/0229872 A1 * | 10/2005 | Lange | C01B 3/323 123/3 |
| 2006/0185985 A1 * | 8/2006 | Jones | B01D 53/1418 205/508 |
| 2007/0267289 A1 * | 11/2007 | Jabs | B01J 19/088 204/170 |
| 2007/0278795 A1 * | 12/2007 | Berkson | 290/40 C |

FOREIGN PATENT DOCUMENTS

| | | |
|---|---|---|
| JP | 2004-359492 | 12/2004 |
| WO | WO 02/04346 A1 | 1/2002 |
| WO | WO 03/010088 A1 | 2/2003 |

OTHER PUBLICATIONS

Jamal et al., "On-Board Generation of Hydrogen-Rich Gaseous Fuels—A Review," International Journal of Hydrogen Energy, vol. 19, No. 7, 1994, pp. 557-572.

EP Search Report dated Feb. 3, 2010 for European Patent Application No. EP 06736718.5.

PCT International Search Report and Written Opinion dated Jun. 8, 2006 for International Application No. PCT/US06/07446.

English translation of Office Action dated Dec. 8, 2009 for Japanese Patent Application No. JP 2007-558226.

* cited by examiner

METHOD FOR DECARBONIZATION OF A FUEL ON BOARD A VEHICLE

FIELD OF THE INVENTION

This invention relates to the reduction of carbon dioxide ($CO_2$) emissions from internal combustion engines (ICE) used to power automotive and other vehicles by the on-board treatment of gaseous and/or liquid hydrocarbon fuels.

BACKGROUND OF THE INVENTION

There are growing concerns about the apparent relationship of increasing the concentration of greenhouse gases and the global warming phenomenon. As a consequence, a broad consensus has developed as to the need to reduce $CO_2$ emissions associated with various human activities.

Carbon dioxide emissions ($CO_2$) from hydrocarbon-fueled transportation vehicles powered by internal combustion engines (ICE) constitute a significant part of the total man-made greenhouse gas emissions. As a result, adoption of new rules to significantly reduce $CO_2$ from vehicles are currently being considered in many countries around the world. As an example, action was recently taken by the State of California to adopt new regulations that require significant reductions in $CO_2$ emissions from road vehicles by the year 2016.

Emissions of $CO_2$ from stationary energy sources such as power plants can be efficiently separated and captured either ahead of, or after the combustion process using processes and apparatus known in the art. These techniques are impractical in the case of mobile vehicular systems such as automobiles, trucks and buses, principally due to the associated high cost and limited availability of on-board space. Current efforts to address the need to reduce $CO_2$ emissions from mobile systems, such as transport vehicles, involve optimization of fuel economy through measures that include enhancing the efficiency of the combustion engine and the power train, adoption of more fuel-efficient power trains (e.g., hybrids), and the reduction of rolling and drag losses.

All of these steps taken together have resulted in a measurable reduction of $CO_2$ emissions from automobiles. However, the extent of these reductions may not be sufficient to maintain an acceptable level of $CO_2$ emissions in view of the rapidly growing automotive transportation sector. Because of these concerns, alternative propulsion systems using non-carbon or carbon-neutral fuels have been given serious consideration and it has been urged by some that they gradually replace current hydrocarbon-fueled ICE-based systems. These alternative systems, however, will require substantial alterations to the transportation fueling infrastructure that has been developed on a worldwide basis over the past century.

Various strategies have been proposed for reducing the production of $CO_2$ entering the atmosphere to mitigate global warming. Decarbonization of fossil fuels has been identified with the process of removing carbon before or after combustion. Fossil Fuel Decarbonization Technology for Mitigating Global Warming, Brookhaven National Laboratory (1997-98).

It has been proposed that natural gas be subjected to thermal decomposition, or pyrolysis, in the absence of air for the production of (1) hydrogen as a clean-burning fuel or feed stream to fuel cells and (2) carbon black, which is a form of elemental carbon. Hydrogen from Natural Gas Without Release of $CO_2$ to the Atmosphere, Int'l S. Hydrogen Energy, Vol. 23, No. 12, pp. 1087-1093 (1998). The thermal decomposition in this case is achieved by a plasma arc process that utilizes electricity to form the plasma using hydrogen.

A process for the thermocatalytic decomposition of hydrocarbons into hydrogen and elemental carbon in the absence of air has been disclosed. Thermocatalytic $CO_2$-Free Production of Hydrogen from Hydrocarbon Fuels, N. Muradov, Proceedings of the 2002 U.S. DOE Hydrogen Program Review, NREL/CP-6 10-32405. The reaction is catalyzed by the carbon particles produced in the process.

A process for methane decomposition in the presence of a small amount of oxygen in an auto-thermal regime was disclosed by N. Muradov in a keynote paper presented at the 2nd European Hydrogen Energy Conference, Spain, November 2005. This process uses activated carbon as a catalyst for the decomposition reaction.

SUMMARY OF THE INVENTION

The present invention broadly comprehends a method and apparatus that utilizes a decarbonization unit on board the vehicle adjacent to the engine used to power automotive and other types of vehicles that constitute a hydrocarbon-based transportation system. The decarbonization unit treats a portion or all of the fuel and separates a portion of the carbon from the hydrocarbon fuel used to power the ICE, separates the produced hydrogen or hydrogen-rich gas from the carbon particles and temporarily stores the carbon on board the vehicle.

The carbon is extracted in the form of elemental carbon powder. The carbon preferably is in the form of a powder, that is, it is of a very fine or small particle size. Various scrapers or other particle disaggregating devices can be used downstream or included as a part of the separator to achieve this result. The stored carbon is withdrawn from the vehicle periodically, e.g., at refueling stations, and eventually transported to a central storage area or directly to an industrial user. The carbon itself is a relatively high-value material that can be used in the manufacture of tires, plastics, paints, inks, steel, gaskets, and a wide variety of other products.

Alternatively, part of this produced carbon can be used to power a carbon-based fuel cell that serves as an on-board auxiliary power generating unit to satisfy some or all of the vehicle's electrical power requirements.

The hydrogen or hydrogen-rich gas that has been separated from the carbon can be fed to the ICE, increasing the fuel's overall hydrogen-to-carbon ratio. This will result in a reduction in $CO_2$ emissions, and will also have a positive effect on the vehicle's overall fuel combustion efficiency.

The hydrogen generated can also be utilized for other on-board applications, such as powering a fuel cell-based auxiliary power unit that will also contribute to enhanced fuel efficiency and which would otherwise require a dedicated on-board fuel reformer.

A portion of the hydrogen separated from the fuel can also be used in the after-treatment of the exhaust gases from the ICE. In one embodiment, the hydrogen, or hydrogen-rich gas, is employed as a reducing agent for a hydrogen-based selective catalytic reduction (SCR) after-treatment system for nitrogen oxides, or NOx, emissions from the ICE.

The present invention provides a method of limiting $CO_2$ emissions fro ICE-based transportation systems that requires a relatively modest modification to the existing infrastructure. The fuels treated in the decarbonization unit can be any hydrocarbon fuel used for transportation vehicles including gasoline, diesel, naphtha, ethanol, natural gas, and blends of two or more of these fuels.

Carbon storage and collection systems, including pumps and conduits, are currently available and can be installed at existing fueling stations. Instead of being a liability, the carbon (which constitutes the major portion of hydrocarbon fuels) is separated by this invention in the form of a useful material that can be used as a feedstock for important domestic and international manufacturing industries, or as a fuel or fuel extender for boilers, gasifiers and industrial furnaces. The implementation of this invention will eliminate the need for a costly transition to alternative carbon-free fueling infrastructure, and will create new business opportunities for establishing a parallel carbon-based industry.

BRIEF DESCRIPTION OF THE DRAWINGS

The invention will be further described below with reference to the attached drawings in which.

DETAILED DESCRIPTION OF THE INVENTION

Figure 1:
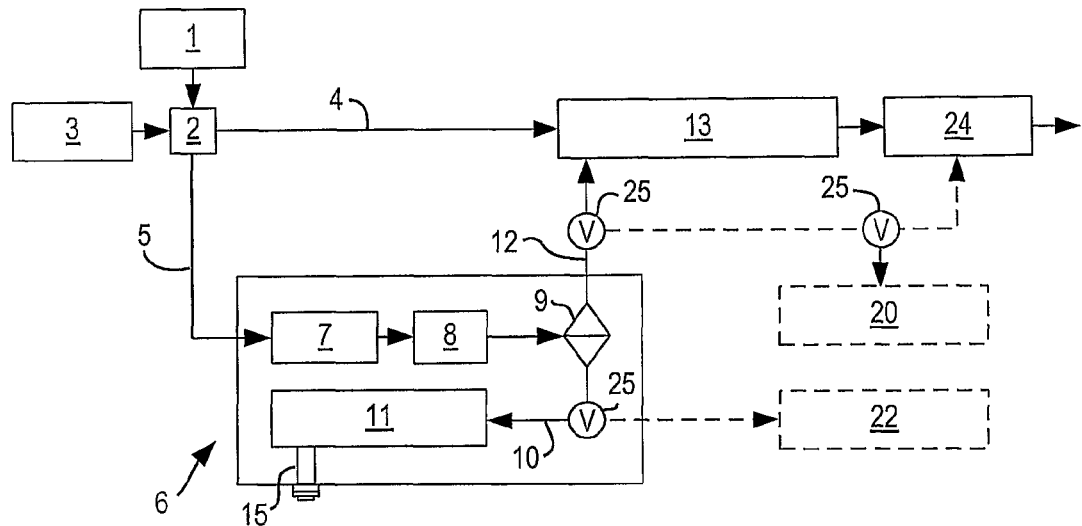
FIG. 1 is a schematic diagram illustrating a first preferred embodiment of the arrangement of apparatus for practicing the method of the invention on board an automotive vehicle.

Referring to FIG. 1, a conventional hydrocarbon fuel, e.g., gasoline or diesel, flows from fuel tank 1 to fuel system distribution valve 2 that functions in conjunction with microprocessor/controller 3 to regulate the flow of fuel and distribute it to internal combustion engine 13 through fuel line 4 and/or to decarbonization unit 6 through fuel line 5. The flow of fuel is based on an optimized fuel distribution scheme programmed in control unit 3.

The decarbonization unit 6 of the present invention, by definition, consists of four major components, namely a decomposer 7, a cooling unit 8, a separator 9 and a carbon storage unit 11.

In the first embodiment, shown in FIG. 1, all or a portion of the fuel is fed to the decomposer 7 where it decomposes or cracks in the absence of air, thereby producing elemental carbon and hydrogen. Depending upon the thermal decomposition efficiency, it is possible that gaseous hydrocarbon compounds will be produced along with the hydrogen. These gaseous hydrocarbon compounds can include methane, ethane, and traces of $C_3$ compounds. Where the fuel contains oxygenates, the thermal decomposition products will include CO and $CO_2$.

The fuel supplied to the decomposer 7 is vaporized, either before or inside the decomposer 7. The thermal decomposition can be achieved by thermocatalysis, a plasma process, or other industrial decomposition processes known to, or to be developed by the art. The heat necessary for the decomposition will be provided by an external source such as electricity, hot exhaust gases, a dedicated burner, or other means presently known in the art or to be developed. The thermocatalytic decomposition process has the advantage of operating at a relatively lower temperature than other non-catalytic decomposition processes.

The carbon and hydrogen, or hydrogen-rich gas, are transported to cooler 8 for cooling, and then moved to separator 9, which separates the solid elemental carbon in a powdery form from the gaseous hydrogen or hydrogen-rich gas. The carbon is transported from separator 9 through line 10 to storage unit 11 that has a capacity conforming to the vehicle's refueling intervals. The storage unit 11 is provided with an access port or outlet 15 for periodically unloading the carbon.

The hydrogen, or hydrogen-rich gas, from the separator 9 is passed through line 12 and is fed to internal combustion engine 13 and/or used for other purposes. Hydrogen, or hydrogen-rich gas, is introduced to combustion engine 13 either through the intake manifold where it mixes with intake air or an intake air/fuel mixture, or through a special injector that injects it directly into the combustion chamber.

Figure 2:
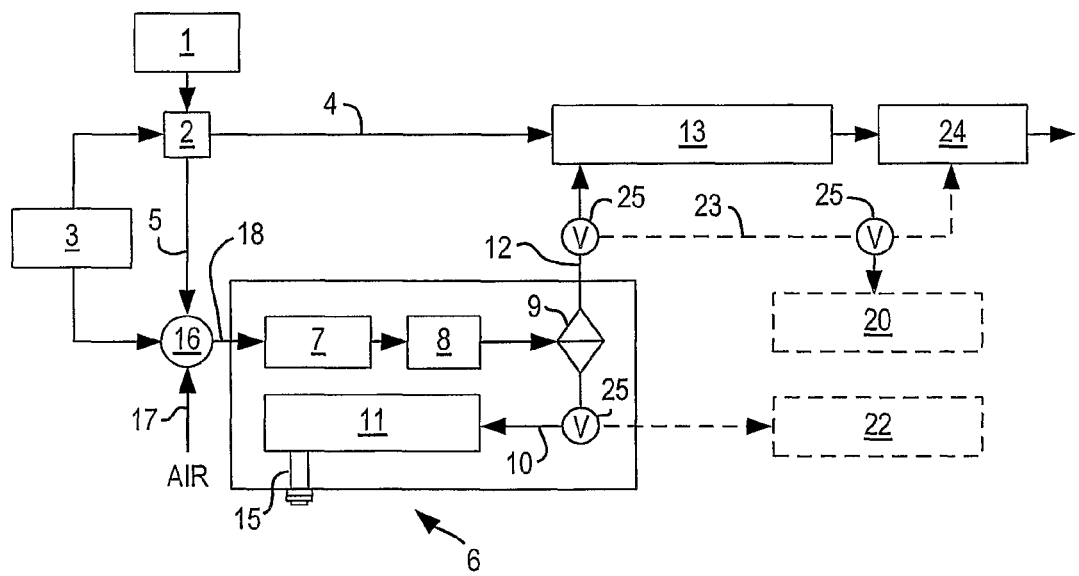
FIG. 2 is a schematic diagram similar to FIG. 1, and illustrating a second preferred embodiment of apparatus and a method for the practice of the invention on board an automotive vehicle.

In the second embodiment, as illustrated schematically in FIG. 2, the fuel coming from fuel system 2 through line 5 is vaporized and mixed with a controlled amount of air (17) in the mixing unit 16. This air-fuel mixture (18) is then fed to decomposer 7 in decarbonization unit 6 where exothermic combustion and endothermic decomposition occur simultaneously using catalytic or non-catalytic media. In this process, the heat released by the partial oxidation reaction will provide all or part of the heat necessary to achieve the thermal decomposition of the hydrocarbon fuel into carbon and a hydrogen-rich gas stream.

The ratio of the air-fuel mixture introduced into decomposer 7 is adjusted in order to achieve the desired decomposition temperature. External heating, such as the passage of hot exhaust gases through a heat exchanger, can be employed, if necessary, to supplement the internal heating in order to minimize the fuel energy penalty. Thereafter, the temperature is reduced in cooler 8, the carbon is separated from the hydrogen and other gases, and the process proceeds as described above in connection with the first embodiment and FIG. 1.

Feeding the produced hydrogen or hydrogen-rich gas to the internal combustion engine will improve the fuel combustion efficiency and will have the desirable effect of further reducing carbon emissions.

In a further preferred embodiment illustrated in FIGS. 1 and 2, a portion of the extracted hydrogen, or hydrogen-rich gas can be also used to a power fuel cell-based auxiliary power unit 20, which is an efficient on-board electrical power generation device. Specifically, the hydrogen can be used to power hydrogen-based auxiliary power unit 20 via feed line 23 in conjunction with 3-way valves 25. If necessary, hydrogen can be selectively recovered from any hydrocarbon gases that are present downstream of separator 9 by utilizing methods and apparatus known in the art in order to provide a hydrogen feedstream to on-board fuel cell 20. Additionally, a portion of the hydrogen can be utilized to operate a hydrogen-based after-treatment system 24, or for other purposes that will be apparent to those of ordinary skill in the art.

In a further preferred embodiment, a portion of the separated carbon can be fed via 3-way valve 25 and line 21 to a carbon-based auxiliary power generation unit 22 on board the vehicle. The output of power unit 22 can be used to meet the vehicle's energy requirement and reduce or eliminate the need to operate the vehicle's alternator/generator, thereby improving fuel efficiency.

The invention thus utilizes a novel method to extract a portion of the fuel's carbon content on-board the transportation vehicle resulting in a decrease in carbon dioxide emissions from the vehicle's ICE.

The carbon is extracted in the form of elemental carbon which is a high-value industrial feedstock. It is also in the form of a powder which is safe, easy to collect, store, transport and distribute. Elemental carbon has a significant heating value, e.g., 33.8 MJ/kg compared to 44 MJ/kg for fuel oil, and can be used as a combustible fuel or fuel extender in boilers, gasifiers and industrial furnaces. When the carbon is used in this manner, it will be understood that the invention transfers a portion of the carbon emissions from mobile sources to a stationary source where other means well known in the art can be applied to control carbon dioxide emissions.

As will be apparent to one of ordinary skill in the art, the calculation of the so-called fuel energy penalty, or energy loss, associated with the decarbonization of the engine's fuel in accordance with the invention is based upon a number of variables and assumptions. These variables include the type of fuel, since different fuels have different heating values. The heat that is available for recovery and transfer from the exhaust of the ICE will also vary with the type of fuel being burned and conditions of operation. The size and configuration of the heat exchanger will affect its efficiency. Each type of decomposer 7 has different energy requirements and will operate at different decarbonization efficiencies, and these efficiencies will vary for the same apparatus depending upon the type of fuel being decarbonized. However, regardless of the type of decomposer utilized, the beneficial result of reducing the carbon dioxide emissions from the ICE will be achieved.

It will also be understood by those of ordinary skill in the art that while achieving a 100% conversion rate to hydrogen with the decarbonization process is theoretically possible, in actual practice the conversion will also produce some measurable proportion of hydrocarbon gases.

The following economic analysis demonstrates that on-board partial decarbonization of hydrocarbon fuel is viable process to effectively reduce carbon emissions with a minimal or no adverse financial effect. This example is based on a 25% on-board decarbonization of a gasoline fuel that has an average molecular structure of $C_nH_{1.86n}$ and a higher heating value of 47 MJ/kg. Consequently, the carbon to hydrogen mass ratio is 6.4 to 1, the carbon mass ratio in gasoline is 0.865, and the hydrogen mass ratio in gasoline is 0.135. For the purpose of this analysis, a complete decomposition of gasoline into elemental carbon and hydrogen is assumed.

The total decrease in fuel energy attributable to decarbonization will be equal to the sum of the energy content of the extracted carbon plus the energy required for the fuel decomposition. The energy decrease in the fuel attributable to 25% decarbonization per each one kg of fuel, where carbon has a heating value of 33.8 MJ/kg, is calculated as follows:

$$0.25 \times 0.865 \text{ kg C} \times 33.8 \text{ MJ/kg C} = 7.309 \text{ MJ} \quad (1)$$

The energy required for decomposing the gasoline in this example is estimated to be 1.073 MJ/kg. For 25% decarbonization of 1 kg of fuel, this energy will be equal to:

$$0.25 \text{ kg} \times 1.073 \text{ MJ/kg} = 0.268 \text{ MJ} \quad (2)$$

Therefore, the total energy reduction per each kg of fuel as a result of 25% decarbonization is:

$$\text{Unutilized Carbon Energy} + \text{Decomposition Energy} = 7.309 \text{ MJ} + 0.268 \text{ MJ} = 7.577 \text{ MJ} \quad (3)$$

The energy loss percentage per total energy value theoretically available from 1 kg of the fuel in this example is:

$$7.577 \text{ MJ} \div 47 \text{ MJ} = 16\% \quad (4)$$

Conducting the same analysis on methane will yield a percentage of energy loss equal to 13% for the 25% decarbonization case. For diesel fuel, this percentage should be close to that of gasoline.

A portion of this energy loss will be recovered by the hydrogen enrichment positive effect on the fuel combustion efficiency of the ICE as reported by recent studies such as those conducted at MIT and Delphi (SAE Papers 2005-01-0251 & 2003-01-1356). MIT reported up to 12% enhancement of fuel combustion efficiency due to hydrogen enrichment, while Delphi results indicated up to 24% fuel consumption decrease due to combined effect of hydrogen enrichment and utilization of fuel-cell based auxiliary power unit. As an added benefit, it is also reported that hydrogen enrichment will dramatically reduce the formation of nitrogen oxides (NOx).

As reported by recent studies, using a portion of the hydrogen produced by the decarbonization unit to power a fuel cell-based auxiliary power unit will also improve the overall fuel efficiency, thereby further compensating for the energy reduction of decarbonization.

In certain cases, the energy requirements for the fuel decomposition process can be significantly reduced by using the heat of the engine's exhaust gases to raise the temperature of the fuel that is to be decomposed.

The recovered carbon also has a dollar value that is applicable to compensate for the value of the lost energy and to cover the expenses associated with any infrastructure investments, transportation costs, handling and storage. The value of the carbon will be dependent on its quality and structure which vary mainly depending on the fuel type and the decomposition process. Based on the results published for methane decomposition, the carbon produced using thermocatalytic decomposition process is expected to be dominated by amorphous and crystalline graphite, of which the price ranges from $0.22-0.41 per kg [SRI International, Chemical Economics Handbook, 1997]. Plasma decomposition is expected to yield amorphous forms of carbon, e.g., carbon black which is priced in the range of $0.66-1.08 per kg [Chemical Marketing Reporter, 2001; Chemical Week, 2001].

In an average passenger car with 75-liter fuel tank, 25% decarbonization can be expected to produce about 12 kg of elemental carbon. The dollar value of this amount of carbon will be about $3.60 for graphitic carbon (assuming an average price of $0.30/kg), and about $9.60 for carbon black (assuming an average price of $0.80/kg).

The reduction in carbon dioxide emissions will also by itself, represent an economic opportunity for countries participating in the Kyoto protocol. A credit for $CO_2$ emission reduction by this invention can be claimed for a Clean Development Mechanism (CDM) project.

In summary, the current invention will result in a loss of some of the fuel energy, depending upon the scale of the decarbonization process. However, this energy loss can be minimized by taking into account the hydrogen enrichment effect, utilizing on-board fuel cell auxiliary power generation, and recovery of heat energy from exhaust gases for use in the decomposition process. In addition, part or all of this loss is compensated for by the value of the elemental carbon recovered and the $CO_2$ credit associated with Kyoto Protocol CDM projects or other applicable environmental regulatory schemes.

This analysis establishes that the partial decarbonization process of the invention is viable for use in an average passenger car. The economics improve for larger vehicles where more space is available, the intervals between refueling are longer, and the efficiency improvement due to utilization of an auxiliary power unit is foreseeably greater.

As will be apparent to one of ordinary skill in the art, the modes of operation utilizing the method and apparatus of the invention can be varied to meet the specific needs of the particular type and even model of transport vehicle, whether it be a car, truck, bus, train, ship, or other conveyance. In all such instances, it will also be apparent that the goal of reducing $CO_2$ emissions from the ICE will be achieved by the practice of the invention.

Thus, the scope of the invention is not to be determined solely with reference to the general description and the specific embodiments set forth above and in the drawings, but by the interpretation of the claims that follow.

We claim:

1. A method for the reduction of emissions of $CO_2$ from a vehicle powered by a hydrocarbon fuel-burning internal combustion engine (ICE) by subjecting at least a portion of the fuel to on-board decarbonization, the method comprising:
    (a) providing an on-board decarbonization unit that includes a decomposer, a cooler, a gas and solid separator and a carbon storage unit;
    (b) feeding a gaseous or vaporized liquid hydrocarbon fuel selected from the group consisting of gasoline, diesel, naphtha, ethanol, and blends of two or more of these fuels to the decomposer on board said vehicle to thereby cause said fuel to decompose and to produce hydrogen or a hydrogen-rich gas, and elemental carbon;
    (c) subjecting the hydrogen or the hydrogen rich-gas, and the carbon to cooling in an on-board heat exchanger;
    (d) separating the hydrogen or hydrogen-rich gas from the carbon in the gas and solid separator;
    (e) transferring the separated carbon from the gas and solid separator to the on-board carbon storage unit;
    (f) providing a microprocessor and an electronic control unit programmed with an optimized fuel distribution scheme to adjust the fuel flow rates to distribute the fuel to the decarbonization unit and to the internal combustion engine to meet the operational requirements of the vehicle, wherein all or a portion of the fuel is fed to the decomposer; and
    (g) delivering the hydrogen or hydrogen-rich gas to the vehicle's ICE for use alone or mixed with the fuel.

2. The method of claim 1, wherein the decomposition of said fuel in said decomposer is effected by a decomposition process selected from the group consisting of a thermocatalytic decomposition process, and a super-adiabatic combustion process.

3. The method of claim 1, wherein the heat required for the decomposition of the fuel is provided from an external source selected from the group consisting of electricity, hot exhaust gases, a dedicated burner, and combinations thereof.

4. The method of claim 1, wherein the hydrogen or hydrogen-rich gas is delivered to the vehicle's ICE for mixing with intake air or an air/fuel mixture, or injected directly into the combustion chamber, to enhance the engine's combustion efficiency.

5. The method of claim 1, wherein a portion of the hydrogen or hydrogen-rich gas is employed as a reducing agent for a hydrogen-based selective catalytic reduction (SCR) after treatment of nitrogen oxide ($NO_x$) emissions from the vehicle's ICE.

6. The method of claim 1, wherein the hydrogen or the hydrogen-rich gas is employed to operate a hydrogen-based fuel cell as an on-board auxiliary power unit, to thereby provide electrical energy for the vehicle's electrical requirements.

7. The method of claim 1, wherein the carbon separated in step (d) is employed to operate a carbon-based fuel cell as an on-board auxiliary power unit, to thereby provide electrical energy for the vehicle's electrical requirements.

8. The method of claim 1, wherein the carbon recovered from the vehicle is processed for use as a feedstock in the manufacture of tires, in metallurgical processes, toners, inks, paints, seals and gaskets, as a fuel or fuel extender for boilers, gasifiers and industrial furnaces.

9. The method of claim 1 in which up to 100% of the fuel utilized to power the vehicle is treated in the on-board decarbonization unit as determined by the programmed electronic control unit based on the vehicle's operational requirements.

10. The method of claim 1 in which the gas and solid separator is selected from gas and solid separation cyclones, membranes, and filtration systems.

11. The method of claim 1 which further includes controlling the flow of hydrogen or hydrogen-rich gas produced by the decarbonization unit to the internal combustion engine and to other uses including the hydrogen-based fuel-cell auxiliary power unit and hydrogen-based aftertreatment.

12. The method of claim 1 which further includes controlling the flow of a portion of the separated carbon produced in the decarbonization unit to an on-board carbon-based fuel-cell auxiliary power unit.

13. The method of claim 1 which includes the further steps of:
    (g) mixing the hydrocarbon fuel with air to provide an air/fuel mixture upstream of the decomposer;
    (h) introducing the air/fuel mixture into the decomposer under conditions to effect simultaneous exothermic partial oxidation reaction and endothermic decomposition of the hydrocarbon fuel, thereby producing elemental carbon and a hydrogen-rich gas.

14. The method of claim 13 in which a catalytic decomposition process or a super-adiabatic combustion process is utilized to achieve the simultaneous partial oxidation and thermal decomposition of the fuel, wherein the heat released from partial oxidation provides all or part of the heat needed for decomposition.

15. The method of claim 13 in which external heating, such as heat from the engine's exhaust gases, is utilized in conjunction with internal heating to maximize the heat efficiency usage.

16. An apparatus for the reduction of emissions of $CO_2$ from a liquid hydrocarbon fuel-burning internal combustion engine (ICE) used to power a vehicle, the apparatus comprising an on-board decarbonization unit that includes
    (a) a decomposer that decomposes vaporized fuel selected from the group consisting of gasoline, diesel, naphtha, ethanol, and blends of two or more of these fuels to produce hydrogen or a hydrogen-rich gas, and elemental carbon;
    (b) a cooler in fluid communication with the decomposer for cooling the hydrogen or the hydrogen rich-gas, and the carbon by heat exchange;
    (c) a gas and solid separator in fluid communication with the cooler for receiving cooled hydrogen or hydrogen-rich gas and carbon and separating the hydrogen or hydrogen-rich gas from the carbon;
    (d) an on-board carbon storage unit in communication with the gas and solid separator for receiving separated carbon;
    (e) means for delivering the hydrogen or hydrogen-rich gas from the separator to the vehicle's ICE for use as a decarbonized fuel; and (f) a microprocessor and an electronic control unit having an optimized fuel distribution program by which the fuel flow rates from an on-board hydrocarbon fuel storage tank to the decarbonization unit and to the internal combustion engine are adjusted to meet the operational requirements of the vehicle.

17. The apparatus of claim 16, wherein the decomposer utilizes a decomposition process selected from the group consisting of a thermocatalytic decomposition process, a plasma decomposition process, an auto-thermal catalytic decomposition process, and a super-adiabatic combustion process.

18. The method of claim 1, in which the electronic control unit is operably connected to a fuel valve which is responsive to the electronic control unit's fuel distribution scheme by which the fuel flow rates to the decarbonization unit and to the internal combustion engine are adjusted.

\* \* \* \* \*